United States Patent
Sipcic et al.

(10) Patent No.: US 11,722,470 B2
(45) Date of Patent: Aug. 8, 2023

(54) ENCRYPTED DATA ACCORDING TO A SCHEMA

(71) Applicant: International Business Machines Corporation, Armonk, NY (US)

(72) Inventors: Slobodan Sipcic, Bethesda, MD (US); Peeyush Jaiswal, Boca Raton, FL (US); Priyansh Jaiswal, Boca Raton, FL (US); Austin Michael Delamar, Lansing, MI (US); Naeem Ahmed, Troy, MI (US); Rahul Ragunathan, Okemos, MI (US)

(73) Assignee: International Business Machines Corporation, Armonk, NY (US)

( * ) Notice: Subject to any disclaimer, the term of this patent is extended or adjusted under 35 U.S.C. 154(b) by 356 days.

(21) Appl. No.: 16/116,583

(22) Filed: Aug. 29, 2018

(65) Prior Publication Data
US 2020/0076777 A1    Mar. 5, 2020

(51) Int. Cl.
*H04L 9/40* (2022.01)
*H04L 9/08* (2006.01)
*H04L 67/562* (2022.01)

(52) U.S. Cl.
CPC ........ *H04L 63/0442* (2013.01); *H04L 9/0825* (2013.01); *H04L 67/562* (2022.05)

(58) Field of Classification Search
CPC ............... H04L 63/0442; H04L 9/0825; H04L 67/2809
USPC ....................................................... 713/168
See application file for complete search history.

(56) References Cited

U.S. PATENT DOCUMENTS

| | | | | |
|---|---|---|---|---|
| 6,931,532 B1 * | 8/2005 | Davis | .................. | G06F 21/6209 705/76 |
| 6,961,849 B1 * | 11/2005 | Davis | .................. | G06F 21/6227 380/273 |
| 7,426,752 B2 * | 9/2008 | Agrawal | ................. | G06F 21/60 726/26 |
| 7,552,467 B2 * | 6/2009 | Lindsay | .................. | G06F 21/31 726/5 |

(Continued)

FOREIGN PATENT DOCUMENTS

| EP | 4102367 A1 * | 12/2022 | ......... H04L 67/2823 |
|---|---|---|---|
| WO | WO-2018208787 A1 * | 11/2018 | ......... H04L 63/0442 |

OTHER PUBLICATIONS

Shopify, "EJSON—A JSON File with Asymmetric-key-encrypted values," retrieved from: https://shopify.github.io/ejson/ejson.5.html, Nov. 2014, 2 pp.

(Continued)

*Primary Examiner* — Shahriar Zarrineh
(74) *Attorney, Agent, or Firm* — Robert J. Shatto

(57) ABSTRACT

A producer system may insert an encrypted value in a field in a message, where the message is associated with a schema that specifies a public key used to encrypt the encrypted value of the field and further specifies a type of an unencrypted form of the encrypted value, insert one or more unencrypted values in one or more fields in the message, and send the message to an external computing system. A consumer system may receive the message, determine, based at least in part on the public key specified by the schema, a private key associated with the public key, and decrypt, using the private key, the encrypted value of the field into the unencrypted form of the encrypted value.

25 Claims, 5 Drawing Sheets

(56) References Cited

U.S. PATENT DOCUMENTS

| | | | | |
|---|---|---|---|---|
| 8,291,490 B1* | 10/2012 | Ahmed | G06F 21/604 | 726/20 |
| 8,412,837 B1* | 4/2013 | Emigh | H04L 9/30 | 705/65 |
| 9,075,833 B2* | 7/2015 | Gao | G06F 16/211 | |
| 9,100,183 B2* | 8/2015 | Movshovitz | H04L 9/0618 | |
| 9,461,817 B2* | 10/2016 | Moore | H04L 9/08 | |
| 9,887,975 B1* | 2/2018 | Gifford | H04W 12/1006 | |
| 10,438,176 B2* | 10/2019 | Johnson | G06Q 20/382 | |
| 10,476,855 B1* | 11/2019 | Peddada | H04L 9/0825 | |
| 10,615,970 B1* | 4/2020 | Griffin | H04L 9/3247 | |
| 10,635,657 B1* | 4/2020 | Prakash | G06F 21/602 | |
| 10,673,880 B1* | 6/2020 | Pratt | H04L 63/1433 | |
| 10,721,523 B2* | 7/2020 | Deshpande | H04H 60/31 | |
| 10,776,441 B1* | 9/2020 | Echeverria | H04L 67/75 | |
| 11,182,225 B1* | 11/2021 | Yuen | G06F 16/958 | |
| 2001/0020228 A1* | 9/2001 | Cantu | H04L 9/3213 | 705/50 |
| 2004/0120519 A1* | 6/2004 | Joye | H04L 9/30 | 380/30 |
| 2004/0230792 A1* | 11/2004 | McCarty | G06F 21/10 | 713/153 |
| 2004/0243816 A1* | 12/2004 | Hacigumus | G06F 16/24561 | 713/193 |
| 2005/0039034 A1* | 2/2005 | Doyle | H04L 9/3263 | 713/193 |
| 2005/0071359 A1* | 3/2005 | Elandassery | G06F 16/213 | |
| 2006/0005067 A1* | 1/2006 | Llyod, Jr. | G06F 11/36 | 714/4.1 |
| 2008/0005138 A1* | 1/2008 | Gauthier | G06F 40/154 | |
| 2010/0070765 A1* | 3/2010 | Ogg | G07B 17/0008 | 713/168 |
| 2010/0185862 A1* | 7/2010 | Moore | H04L 9/08 | 713/171 |
| 2010/0185869 A1* | 7/2010 | Moore | H04L 9/3247 | 713/179 |
| 2012/0278634 A1* | 11/2012 | Luukkala | G06F 21/6245 | 713/189 |
| 2013/0290700 A1* | 10/2013 | Davis | H04L 9/3236 | 713/153 |
| 2014/0181141 A1* | 6/2014 | Sowell | G06F 16/901 | 707/769 |
| 2015/0039912 A1* | 2/2015 | Payton | H04L 9/008 | 713/193 |
| 2015/0229613 A1* | 8/2015 | Baum | G06F 16/00 | 713/171 |
| 2015/0341176 A1* | 11/2015 | Staykov | H04L 9/3247 | 713/176 |
| 2016/0204941 A1* | 7/2016 | Utin | G06F 21/62 | 713/168 |
| 2017/0170952 A1* | 6/2017 | Hart | H04L 9/0618 | |
| 2018/0019985 A1* | 1/2018 | Schoof | H04L 9/3242 | |
| 2018/0246950 A1* | 8/2018 | Arye | G06F 16/2282 | |
| 2018/0254892 A1* | 9/2018 | Egorov | H04L 9/0891 | |
| 2018/0373847 A1* | 12/2018 | Lo | H04L 63/062 | |
| 2019/0095626 A1* | 3/2019 | Mohan | H04L 63/1433 | |
| 2019/0149317 A1* | 5/2019 | Payton | H04L 9/008 | 713/193 |
| 2020/0074104 A1* | 3/2020 | Sommerville | G06F 21/6227 | |

OTHER PUBLICATIONS

List of Patents treated as related to U.S. Appl. No. 16/116,583, Appendix P, 2 pp.

\* cited by examiner

```
{
  "type": "record",
  "name": "test",
  "fields": [
      {"name": "id", "type": "long"},
      {"name": "fname", "type": "string"},
      {"name": "lname", "type": "string"},
      {"name": "ssn", "type": "fixed", "size": "9", "encrypted": true,
       "method": "AES-CBC-128", "publicKey": "bXlwdWJsaWNrZXk="},
      {"name": "address1", "type": "string"},
      {"name": "address2", "type": "string"},
      {"name": "city", "type": "string"},
      {"name": "state", "type": "fixed", "size": "2"},
      {"name": "zip", "type": "fixed", "size": "5"},
      {"name": "country", "type": "fixed", "size": "2"}
  ]
}
```

- 202: "type": "record"
- 204: "name": "test"
- 206: fields
  - 206A: id
  - 206B: fname
  - 206C: lname
  - 206D: ssn (encrypted)
  - 206E: address1
  - 206F: address2
  - 206G: city
  - 206H: state
  - 206J: zip
  - 206K: country

FIG. 2A

```
{"id":"1234567890", "fname":"John", "lname":"Smith",
"ssn":"JX2G5HW2BN4GB39", "address1":"123 Main Street",
"address2":"Unit 3", "city":"Chicago", "state":"IL", "zip":"12345",
"country":"US"}
```

FIG. 2B

ENCRYPTED DATA ACCORDING TO A SCHEMA

BACKGROUND

The disclosure relates to a data processing system and more specifically relates to sending and receiving messages that include encrypted data. A data processing system may send and receive streams of messages brokered via a message broker system, such as an Apache Kafka™-based message broker system, that can potentially read and write messages at a very high rate, such as millions of messages per second. Some of the messages received by the message broker system may contain confidential data. While such messages can be sent and received via secure network protocols such as Transport Layer Security (TLS) or Secure Socket Layers (SSL), so that the messages are encrypted when transmitted to and from the message broker system, the message broker system may also store messages that can be read from the message broker system. As such, there is a need to protect confidential data in messages as the messages persist on the message broker system. Further, because a message broker system may be able to transact streams of messages at a very high rate, there is also a need to protect confidential data in messages in a way that does not significantly affect the rate at which the message broker system transacts streams of messages.

SUMMARY

In one aspect, the disclosure is directed to a method. The method includes inserting, by at least one processor, an encrypted value in a field in a message, wherein the message is associated with a schema that specifies a public key used to encrypt the encrypted value of the field and further specifies a type of an unencrypted form of the encrypted value. The method further includes inserting, by the at least one processor, one or more unencrypted values in one or more fields in the message. The method further includes sending, by the at least one processor, the message to an external computing system. The advantages of the method may include protecting a value in the message that is deemed to be confidential by encrypting the value in the message while not encrypting values in the message that are not deemed to be confidential. Encrypting a portion of the message rather than encrypting an entire message may be less resource intensive and may require fewer processor cycles compared with encrypting the entire message, thereby providing less of an effect on the rate at which messages are generated and sent to a message broker system, and providing less of an effect on the transaction rate of the message broker system compared with encrypting the entire message.

Further, because the message is associated with a schema that specifies the public key that is used to encrypt the encrypted value contained in the message, a recipient of the message that is authorized to decrypt the encrypted value may be able to use the public key to determine the corresponding private key that may be used to decrypt the encrypted value. In addition, because the schema also specifies the type of the unencrypted form of the encrypted value, the recipient of the message may be able to use the schema to validate the encrypted value after the value has been decrypted.

In some examples, where the encrypted value is a first encrypted value in a first field, and where the public key used to encrypt the encrypted value is a first public key, the method may further include inserting, by the at least one processor, a second encrypted value in a second field in the message, where the schema specifies a second public key used to encrypt the second encrypted value, where the schema specifies the type of the unencrypted form of the second encrypted value, and where the second public key is different from the first public key. In this way, the message may include multiple encrypted values that are each encrypted using a different public key. This may enhance the security of the confidential data included in the message so that an entity that has access to one but not all of the private keys used to decrypt one of the encrypted values in the message may nonetheless fail to decrypt other encrypted values in the message.

In another aspect, the disclosure is directed to a computing system. The computing system includes at least one processor. The computing system further includes at least one memory device. The computing system further includes at least one module stored by the at least one memory device and executable by the at least one processor, wherein the at least one module is configured to perform operations comprising: inserting an encrypted value in a field in a message, wherein the message is associated with a schema that specifies a public key used to encrypt the encrypted value of the field and further specifies a type of an unencrypted form of the encrypted value, inserting one or more unencrypted values in one or more fields in the message, and sending the message to an external computing system.

In another aspect, the disclosure is directed to a computer program product. The computer program product comprises a computer readable storage medium having program code embodied therewith, the program code executable by at least one processor to: insert an encrypted value in a field in a message, wherein the message is associated with a schema that specifies a public key used to encrypt the encrypted value of the field and further specifies a type of an unencrypted form of the encrypted value. The program code is further executable by the at least one processor to insert one or more unencrypted values in one or more fields in the message. The program code is further executable by the at least one processor to send the message to an external computing system.

In another aspect, the disclosure is directed to a method. The method includes receiving, by at least one processor a message that includes an encrypted value in a field and one or more unencrypted values in one more fields, where the message is associated with a schema that specifies a public key used to encrypt the encrypted value and further specifies a type of an unencrypted form of the encrypted value. The method further includes determining, by the at least one processor and based at least in part on the public key specified by the schema, a private key associated with the public key. The method further includes decrypting, by the at least one processor using the private key, the encrypted value of the field into the unencrypted form of the encrypted value.

Because only a portion of the message is encrypted rather than the entire message being encrypted, decrypting the encrypted values of the message may be less resource intensive and may require fewer processor cycles when compared to decrypting the entire message, thereby reducing the amount of resources and processor cycles required to decrypt the message. Further, because the message is associated with a schema that specifies the public key that is used to encrypt the encrypted value contained in the message, the recipient of the message that is authorized to decrypt the encrypted value may be able to use the public key to determine the corresponding private key that may be used to decrypt the encrypted value. In addition, because the schema also specifies the type of the unencrypted form of the encrypted value, the recipient of the message may be able to use the schema to validate the encrypted value after the value has been decrypted.

In some examples, the encrypted value is a first encrypted value in a first field, the public key used to encrypt the encrypted value is a first public key, the message further includes a second encrypted value in a second field in the message, the schema specifies a second public key used to encrypt the second encrypted value, the schema specifies the type of the unencrypted form of the second encrypted value, and the second public key is different from the first public key.

In this way, the message may include multiple encrypted values that are each encrypted using a different public key. This may enhance the security of the confidential data included in the message so that an entity that has access to one but not all of the private keys used to decrypt one of the encrypted values in the message may nonetheless fail to decrypt other encrypted values in the message.

In another aspect, the disclosure is directed to a computing system. The computing system includes at least one processor. The computing system further includes at least one memory device. The computing system further includes at least one module stored by the at least one memory device and executable by the at least one processor, wherein the at least one module is configured to perform operations comprising: receiving a message that includes an encrypted value in a field and one or more unencrypted values in one more fields, where the message is associated with a schema that specifies a public key used to encrypt the encrypted value and further specifies a type of an unencrypted form of the encrypted value, determining, based at least in part on the public key specified by the schema, a private key associated with the public key, and decrypting, using the private key, the encrypted value of the field into the unencrypted form of the encrypted value.

The details of one or more aspects of the disclosure are set forth in the accompanying drawings and the description below. Other features, objects, and advantages of the disclosure will be apparent from the description and drawings, and from the claims.

BRIEF DESCRIPTION OF DRAWINGS

FIGS. 2A and 2B illustrate an example schema and an example message associated with the schema according to aspects of the present disclosure.

DETAILED DESCRIPTION

Figure 1:
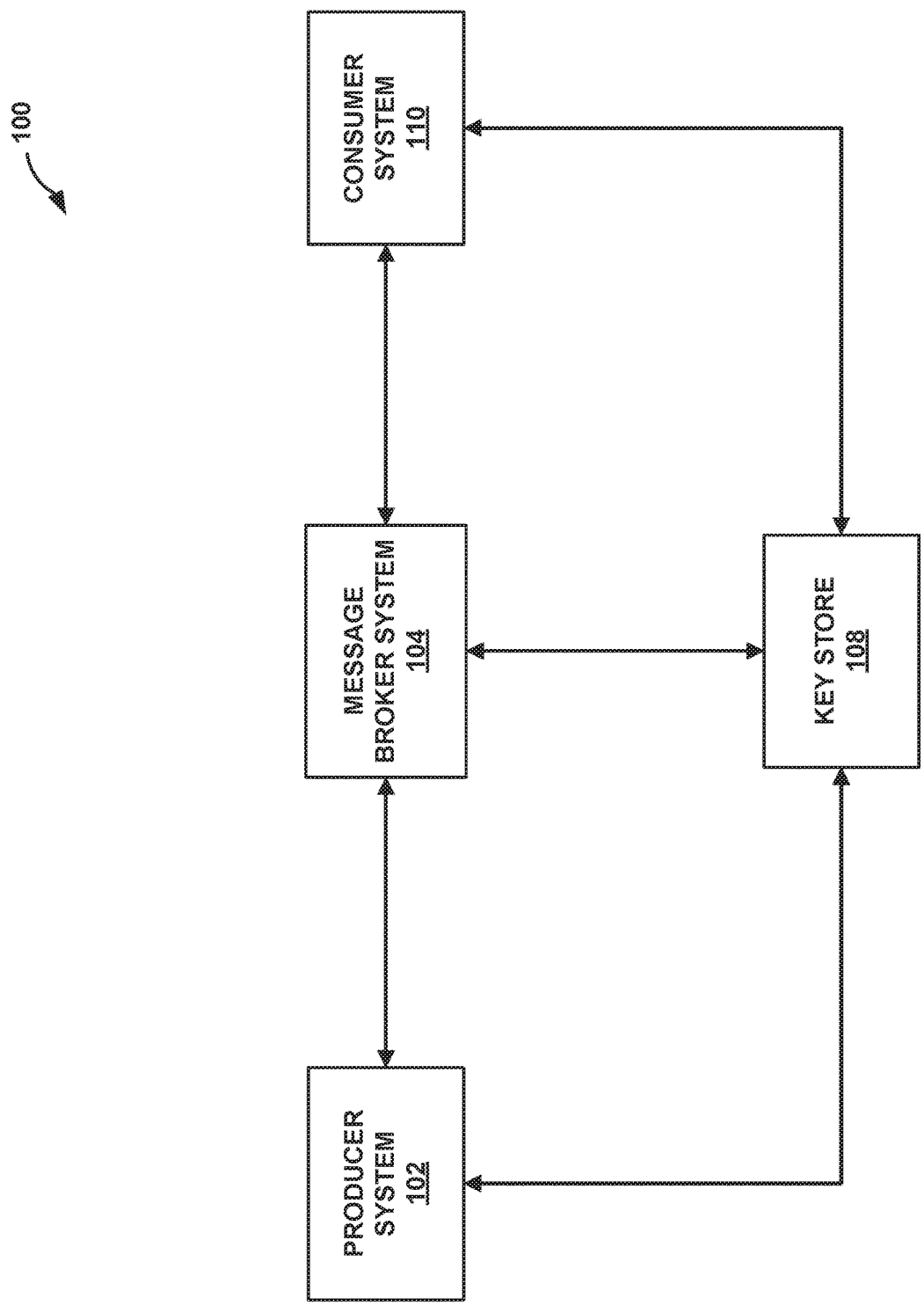
FIG. 1 illustrates a data streaming system according to aspects of the present disclosure.

FIG. 1 illustrates a data streaming system according to aspects of the present disclosure. As shown in FIG. 1, data streaming system 100 may include producer system 102, message broker system 104, key store 108, and consumer system 110. Producer system 102 may send messages to consumer system 110 via message broker system 104.

Producer system 102 may be one of many producers that generates messages and sends streams of messages to message broker system 104. Consumer system 110 may be one of many consumers that subscribe to data streams from message broker system 104 and receives messages associated with the subscribed data streams from message broker system 104. Message broker system 104 may be an intermediary system that facilitates distribution of messages to consumers such as consumer system 110 by receiving streams of messages from producers such as producer system 102, processing the streams of messages from the producers, and sending streams of messages to consumers such as consumer system 110. Producer system 102, message broker system 104, and consumer system 110 may be any suitable computing device or devices, including but not limited to desktop computers, laptop computers, mobile computing devices, servers, server clusters, and the like.

In some examples, message broker system 104 may be a cluster of computing devices that together implement an Apache Kafka™-based message broker system. Apache Kafka™ is a distributed publish-subscribe messaging system that is designed to be fast, scalable, and durable. In the publish-subscribe messaging paradigm, message broker system 104 may maintain feeds of messages in topics. Producer system 102 may send messages that are stored in message broker system 104, and consumer system 110 may read messages from producer system 102.

Producer system 102 may create and send messages that are associated with schemas to message broker system 104, and consumer system 110 may receive, from message broker system 104, messages created by and sent from producer system 102. The messages sent by producer system 102 may include confidential information that are intended to be accessed only by recipients that are authorized to access the confidential information. While encrypting an entire message may protect confidential information contained within the message, encrypting an entire message may be very resource intensive (e.g., processor intensive and memory intensive) and may significantly reduce the rate at which producer system 102 may produce and send messages to message broker system 104.

In accordance with aspects of the present disclosure, in order to protect confidential data stored within a message without significantly reducing the rate in which producer system 102 generates and sends messages within data streaming system 100, producer system 102 may include in a message an encrypted value and may also include in the message one or more unencrypted values. The encrypted values may be confidential information that is encrypted. By including encrypted values as well as unencrypted values in a message, the techniques disclosed herein may be less resource intensive compared with encrypting an entire message and may increase the rate at which producer system 102 may produce and send messages to message broker system 104 compared with encrypting entire messages. In some examples, the message may include multiple encrypted values along with one or more unencrypted values. For example, the message may include a first encrypted value and a second encrypted value.

The data within a message generated by producer system 102 may conform to a schema associated with the message. A schema associated with a message may describe a set of constraints on the structure and on the content of the message. For example, a schema may describe the structure of one or more records contained in the message, the structure of one or more fields of a record, the attributes of the one or more fields, and the like. In some examples, the schema may be defined using JavaScript Object Notation (JSON), such as when the schema is an Apache Avro™ schema. In other examples, a schema in accordance with techniques of this disclosure may be defined in any other suitable format, such as eXtensible Markup Language (XML) and the like. Details of an example schema are discussed in further detail below with respect to FIG. 2A.

Aspects of the present disclosure may utilize asymmetric encryption to encrypt data in a message using a public key, so that the encrypted data can only be decrypted using a corresponding private key. Pairs of public and private keys may be generated using any suitable technique. A schema associated with a message may define the value of a field in the message as being encrypted and may also specify the public key used to encrypt the value of the field in the message. In some examples, a schema may define the values of multiple fields in the message as being encrypted. The schema may specify a different public key to encrypt the value of each of the respective fields. For example, the schema may specify a first public key used to encrypt a first encrypted value in a message and may specify a second public key, different from the first public key, to encrypt the second encrypted value. Using a different public key to encrypt each of a respective plurality of encrypted values in the message may increase the security of the confidential data in the message because an entity that obtains fewer than all of the private keys associated with the public keys cannot decrypt every encrypted value in the message. In other examples, the schema may specify a single public key that is used to encrypt every value of the fields that the schema defines as being encrypted. For example, the schema may include in the schema header the public key used to encrypt every encrypted value in the message.

For each value of the field that is defined as being encrypted, the schema may also define the type and attributes, if any, of the unencrypted form of the value. For example, the schema may define the type of the unencrypted form of the value as an integer, or may define the fixed byte length of the unencrypted form of the value even when the encrypted value of the field may not conform to the type or attributes specified by the schema for the unencrypted form of the value. By defining the type and attributes of the unencrypted form of the value, consumer system 110 may use the schema to perform validation of the message once the value has been decrypted or use the schema for further processing of the message.

Producer system 102 may generate a message that is associated with a schema. Because the message is associated with the schema, the contents of the message conforms with the structure defined in the schema. For example, Producer system 102 may include in the message fields as defined in the schema having values that are constrained according to the schema. Producer system 102 may include one or more encrypted values in fields that are specified in the schema as containing encrypted values, where the one or more encrypted values are encrypted using the corresponding public key or public keys specified in the schema. Producer system 102 may also include in the same message one or more values that are not encrypted in fields that are not specified in the schema as containing encrypted values. In this way, producer system 102 may generate a message associated with the schema, where the message includes one or more encrypted values and one or more unencrypted values.

Producer system 102 may send the generated message to message broker system 104. In some examples, instead of sending the message to message broker system 104, producer system 102 may send the message directly to consumer system 110. As part of sending the message, producer system 102 may serialize the message. Serializing the message converts the message into a specified data format or data structure that can be stored or transmitted. For example, the serialized message can be transmitted to message broker system 104 and/or stored at message broker system 104. Examples of data formats into which a message may be serialized include an Apache Avro™ serialization format, JSON, binary data, and the like.

In some examples, producer system 102 may send both the message in the serialized format and its associated schema to message broker system 104. In other examples, message broker system 104 or an external schema storage system may store the schema associated with a message, so that producer system 102 may serialize a message and send the serialized message to message broker system 104 without sending the associated schema to message broker system 104.

Message broker system 104 may receive the message in the serialized format and may store the received message. Message broker system 104 may associate the message with a particular data stream and may send the message in the serialized format to consumer systems (e.g., consumer system 110) that are subscribed to receive messages associated with the particular data stream.

Consumer system 110 may be subscribed to the data stream associated with the message and may receive the message from message broker 104. As discussed above, the message may include an encrypted value in a field and may also include one or more values in one or more fields that are not encrypted. Because consumer system 110 receives the message in the serialized format, consumer system 110 may deserialize the message in order to read the values included in the message. Consumer system 110 may deserialize the message using the schema associated with the message, so that consumer system 110 may read the values contained within the message. Because the schema specifies the public keys used to encrypt the encrypted values contained within the message, consumer system 110 may use the public keys specified in the schema to obtain the private keys that can be used by consumer system 110 to decrypt the encrypted values contained within the message.

Key store 108 may be any suitable computer readable storage device or storage system and may store private keys that may be used to decrypt encrypted values of messages. Key store 108 may, for example, store associations between public keys and corresponding private keys so that a private key may be looked up and retrieved using the corresponding public key. Consumer system 110 may send indications of the public keys specified by the schema to key store 108 and may, in return, receive indications of the corresponding private keys. Consumer system 110 may use the retrieved private keys to decrypt the encrypted values contained in the message into an unencrypted form of the values.

As discussed above, for each value of the field that is defined as being encrypted, the schema may also define the type and attributes, if any, of the unencrypted form of the value. Thus, consumer system 110 may use the schema associated with the message to validate the values contained in the message, including the encrypted values in the message that have been decrypted by consumer system 110 using private keys.

FIGS. 2A and 2B illustrate an example schema and an example message associated with the schema according to aspects of the present disclosure. A schema associated with a message may describe the structure of the associated message, so that computing systems may serialize, deserialize, and/or validate a message using its associated schema.

As shown in FIG. 2A, schema 200 may define a type 202, a name 204, and fields 206A-206K ("fields 206"). Type 202 may indicate the type of data in the message for which schema 200 describes its structure. Name 204 may be the name of the data in the message for which schema 200 describes its structure. Fields 206 may specify the fields of the data in the message for which schema 200 describes its structure. While schema 200 is shown in FIG. 2A as being an Apache Avro™ schema that is defined using JSON, schemas in accordance with techniques of this disclosure may be defined in any suitable format, such as eXtensible Markup Language (XML), Each field of fields 206 defined by schema 200 may specify a name for the field and a type of value for the field. For example, field 206A may specify a name of "id" and may specify the type of the value for field 206A as being a long integer. In another example, field 206B may specify a name of "fname" and may specify the type of the value for the field as a string. Schema 200 may also specify attributes for the values of one or more fields. For example, when schema 200 defines the type of a value for a field as being of a fixed size, schema 206 may specify a size attribute for the value to define the fixed size. In the example of FIG. 2, schema 200 defines the type of the value of field 206H as being of a fixed size by specifying "type":"fixed", and may also define the fixed size as being 2 bytes by specifying "size":"2" as an attribute of field 206H.

In accordance with aspects of the present disclosure, schema 200 may define the value of a field as being encrypted to indicate that the corresponding value in the message is an encrypted value. As shown in FIG. 2, schema 200 may define the value of field 206D as being encrypted by specifying an attribute of "encrypted":true to indicate that the value of field 206D is encrypted.

Schema 200 may define the type and other attributes of field 206D that apply to the unencrypted form of the value. In the example of FIG. 2, schema 200 defines the name of field 206D as being "ssn" and defines the type and attribute of the unencrypted form of the value as being of type fixed with a fixed size of 9. Because the name "ssn" stands for "social security number", which is a number with 9 digits in the United States of America, schema 200 therefore defines the unencrypted form of the value of field 206D as a 9-digit number.

Meanwhile, because schema 200 defines the value of field 206D as being encrypted, the value in the encrypted form may not necessarily conform to the type and attribute defined by schema 200 for field 206D. For example, a value of "123456789" conforms to schema 200's definition of the unencrypted form of the value of field 206D being of type fixed with a fixed size of 9. However, the encrypted form of the value "123456789" may be "JX2G5HW2BN4GB39", which does not conform to schema 200's definition of the unencrypted form of the value of field 206D being of type fixed with a fixed size of 9. Nevertheless, a value for field 206D may conform to schema 200 as long as the unencrypted form of the value conforms to the type and any attributes defined by schema 200 for field 206D.

Schema 200 may also define other attributes of the encrypted value, such as the method of encryption utilized to encrypt the value, such as by defining an encryption method attribute "method": "AES-CBC-128" to define the encryption method as AES-CBC-128.

As shown in FIG. 2B, message 250 is an example message that conforms to schema 200. Message 250 may be an example of a message sent by producer system 102 and received by consumer system 110. Message 250 contains pairs of names and values in the form of "name":"value", where each name identifies a field that corresponds to one of fields 206 defined in schema 200. For example, the field "id" corresponds to field 206A defined in schema 200 and has a value of "1234567590". Similarly, the field "fname" corresponds to field 206B defined in schema 200 and has a value of "John". Field "lname" corresponds to field 206C defined in schema 200 and has a value of "Smith". Field "ssn" corresponds to field 206D defined in schema 200 and has a value of "JX2G5HW2BN4GB39". Field "address1" corresponds to field 206E defined in schema 200 and has a value of "123 Main Street". Field "address2" corresponds to field 206F defined in schema 200 and has a value of "Unit 3". Field "city" corresponds to field 206G defined in schema 200 and has a value of "Chicago". Field "state" corresponds to field 206H defined in schema 200 and has a value of "IL". Field "zip" corresponds to field 206I defined in schema 200 and has a value of "12345". Field "country" corresponds to field 206J defined in schema 200 and has a value of "US".

Message 250 may include both encrypted values and unencrypted values. For example, the values "John" and "Smith" for the fields "fname" and field "lname" are unencrypted values while the value "JX2G5HW2BN4GB39" for the field "ssn" is an encrypted value. As can be seen, the value of the field "ssn" in message 250 is not of type fixed with a fixed size of 9 as specified in schema 200 because the value "JX2G5HW2BN4GB39" is an encrypted value having a size greater than the fixed size of 9. However, the value of the field "ssn" is a valid value for the field "ssn" if the unencrypted form of the encrypted value conforms to the type and size defined in schema 200 for the field. For example, if the value "JX2G5HW2BN4GB39" is the result of encrypting the value "123456789", which conforms to the type and size defined in schema 200, then the value JX2G5HW2BN4GB39" is a valid value for the field "ssn".

Further, as shown in FIG. 2B, message 250 itself may not include the cryptographic key used to generate an encrypted value for a field in the message. While message 250 includes the value of the field "ssn" in an encrypted form, message 250 itself may not include the public key used to encrypt the value of the "ssn" field into the encrypted form. Instead, the public key used to encrypt the value of the "ssn" field into the encrypted form is contained in schema 200 associated with message 250. In other examples, a message may also include the cryptographic key used to generate an encrypted value for a field in the message.

Figure 3:
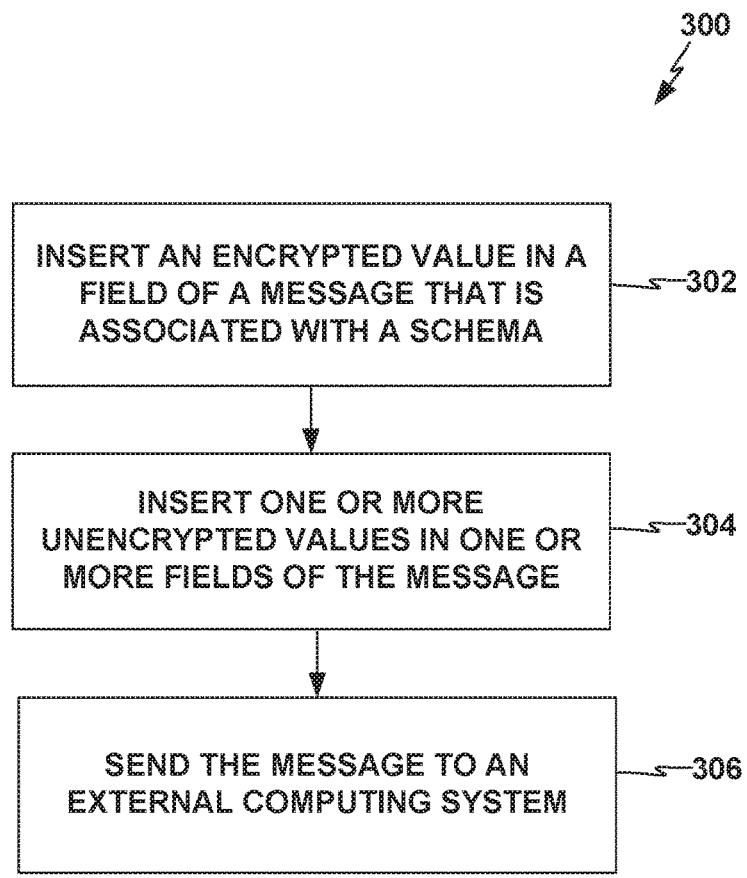
FIG. 3 is a flowchart illustrating a process for generating a message that is associated with a schema.

FIG. 3 is a flowchart illustrating a process for generating a message that is associated with a schema. FIG. 3 is described with respect to FIGS. 1 and 2A-2B. As shown in FIG. 3, producer system 102 may insert an encrypted value in a field in a message, where the message is associated with a schema that specifies a public key used to encrypt the encrypted value of the field and further specifies a type of an unencrypted form of the encrypted value (302). Producer system 102 may further insert one or more unencrypted values in one or more fields in the message (304). Producer system may send the message to an external computing system, such as message broker system 104 or consumer system 110 (306).

In some examples, the encrypted value is a first encrypted value in a first field, where the public key used to encrypt the encrypted value is a first public key, producer system 102 may further insert a second encrypted value in a second field in the message, where the schema specifies a second public key used to encrypt the second encrypted value, where the schema specifies the type of the unencrypted form of the second encrypted value, and where the second public key is different from the first public key. In some examples, the schema specifies the first public key used to encrypt the first encrypted value as a first attribute for the first field and specifies the second public key used to encrypt the second encrypted value as a second attribute for the second field.

In some examples, the schema specifies the type of the unencrypted form of the encrypted value as an attribute for the field, where the attribute for the field specifies a fixed size for the unencrypted form of the encrypted value. In some examples, the schema specifies an encryption algorithm used to encrypt the encrypted value of the field as an attribute for the field. In some examples, sending the message to the external computing system may further include producer 102 serializing the message into an object and sending the object to the external computing system.

Figure 4:
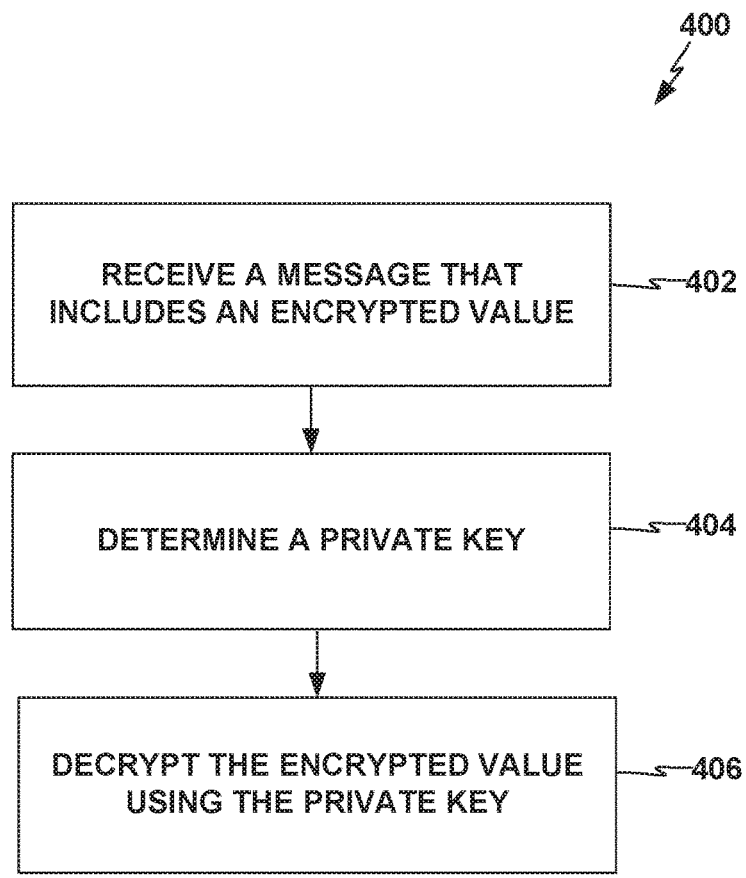
FIG. 4 is a flowchart illustrating a process for processing a message that is associated with a schema.

FIG. 4 is a flowchart illustrating a process for processing a message that is associated with a schema. FIG. 4 is described with respect to FIGS. 1 and 2A-2B. As shown in FIG. 4, consumer system 110 may receive a message, such as from producer system 102 or message broker 104, that includes an encrypted value in a field and one or more unencrypted values in one or more fields, where the message is associated with a schema that specifies a public key used to encrypt the encrypted value and further specifies a type of an unencrypted form of the encrypted value (402). Consumer system 110 may further determine, based at least in part on the public key specified by the schema, a private key associated with the public key (404). Consumer system 110 may decrypt, using the private key, the encrypted value of the field into the unencrypted form of the encrypted value (406).

In some examples, the encrypted value is a first encrypted value in a first field, the public key used to encrypt the encrypted value is a first public key, the message further includes a second encrypted value in a second field in the message, the schema specifies a second public key used to encrypt the second encrypted value, the schema specifies the type of the unencrypted form of the second encrypted value, and the second public key is different from the first public key.

In some examples, the schema specifies the first public key used to encrypt the first encrypted value as a first attribute for the first field, and the schema specifies the second public key used to encrypt the second encrypted value as a second attribute for the second field.

In some examples, the method may further include validating, by the at least one processor, the message based at least in part on the schema, including validating the type of the unencrypted form of the encrypted value based at least in part on the type of the unencrypted form of the encrypted value specified by the schema.

Figure 5:
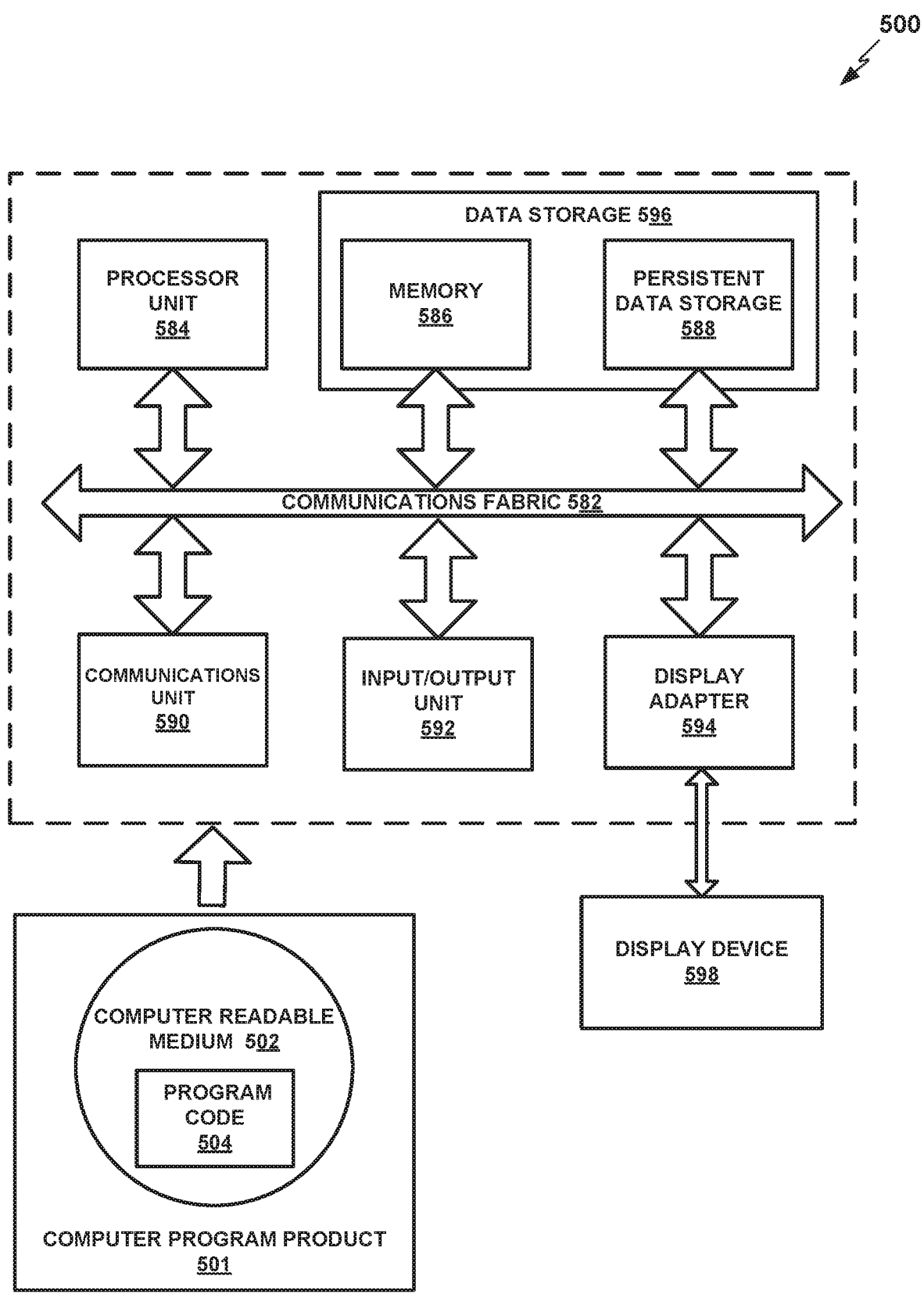
FIG. 5 is a block diagram of a computing device that may be used to perform the techniques of the present disclosure.

FIG. 5 is a block diagram of a computing device 500 that may be used to perform the techniques of the present disclosure. Computing device 500 may be an example of one or more of any of the computing systems described in FIG. 1, such as one of the computing devices making up producer system 102, one of the computing devices making up message broker system 104, one of the computing devices making up consumer system 110, and one of the computing devices making up key store 108. A computing device may operate as all or part of a real or virtual server, and may be or incorporate a workstation, server, mainframe computer, notebook or laptop computer, desktop computer, tablet, smartphone, feature phone, or other programmable data processing apparatus of any kind. Other implementations of a computing device 500 may include a computer having capabilities or formats other than or beyond those described herein.

In the illustrative example of FIG. 5, computing device 500 includes communications fabric 582, which provides communications between processor unit 584, memory 586, persistent data storage 588, communications unit 590, and input/output (I/O) unit 592. Communications fabric 582 may include a dedicated system bus, a general system bus, multiple buses arranged in hierarchical form, any other type of bus, bus network, switch fabric, or other interconnection technology. Communications fabric 582 supports transfer of data, commands, and other information between various subsystems of computing device 500.

Processor unit 584 may be a programmable central processing unit (CPU) configured for executing programmed instructions stored in memory 586. In another illustrative example, processor unit 584 may be implemented using one or more heterogeneous processor systems in which a main processor is present with secondary processors on a single chip. In yet another illustrative example, processor unit 584 may be a symmetric multi-processor system containing multiple processors of the same type. Processor unit 584 may be a reduced instruction set computing (RISC) microprocessor such as a PowerPC® processor from IBM® Corporation, an x86 compatible processor such as a Pentium® processor from Intel® Corporation, an Athlon® processor from Advanced Micro Devices® Corporation, or any other suitable processor. In various examples, processor unit 584 may include a multi-core processor, such as a dual core or quad core processor, for example. Processor unit 584 may include multiple processing chips on one die, and/or multiple dies on one package or substrate, for example. Processor unit 584 may also include one or more levels of integrated cache memory, for example. In various examples, processor unit 584 may comprise one or more CPUs distributed across one or more locations.

Data storage 596 includes memory 586 and persistent data storage 588, which are in communication with processor unit 584 through communications fabric 582. Memory 586 can include a random access semiconductor memory (RAM) for storing application data, i.e., computer program data, for processing. While memory 586 is depicted conceptually as a single monolithic entity, in various examples, memory 586 may be arranged in a hierarchy of caches and in other memory devices, in a single physical location, or distributed across a plurality of physical systems in various forms. While memory 586 is depicted physically separated from processor unit 584 and other elements of computing device 500, memory 586 may refer equivalently to any intermediate or cache memory at any location throughout computing device 500, including cache memory proximate to or integrated with processor unit 584 or individual cores of processor unit 584.

Persistent data storage 588 may include one or more hard disc drives, solid state drives, flash drives, rewritable optical disc drives, magnetic tape drives, or any combination of these or other data storage media. Persistent data storage 588 may store computer-executable instructions or computer readable program code for an operating system, application files comprising program code, data structures or data files, and any other type of data. These computer-executable instructions may be loaded from persistent data storage 588 into memory 586 to be read and executed by processor unit 584 or other processors. Data storage 596 may also include any other hardware elements capable of storing information, such as, for example and without limitation, data, program code in functional form, and/or other suitable information, either on a temporary basis and/or a permanent basis.

Persistent data storage 588 and memory 586 are examples of physical, tangible, non-transitory computer readable data storage devices. Data storage 596 may include any of various forms of volatile memory that may require being periodically electrically refreshed to maintain data in memory, while those skilled in the art will recognize that this also constitutes an example of a physical, tangible, non-transitory computer readable data storage device. Executable instructions may be stored on a non-transitory medium when program code is loaded, stored, relayed, buffered, or cached on a non-transitory physical medium or device, including if only for only a short duration or only in a volatile memory format.

Processor unit 584 can also be suitably programmed to read, load, and execute computer-executable instructions or computer readable program code for data analyzer 23, as described in greater detail above. This program code may be stored on memory 586, persistent data storage 588, or elsewhere in computing device 500. This program code may also take the form of program code 504 stored on computer readable medium 502 comprised in computer program product 500, and may be transferred or communicated, through any of a variety of local or remote means, from computer program product 500 to computing device 500 to be enabled to be executed by processor unit 584, as further explained below.

The operating system may provide functions such as device interface management, memory management, and multiple task management. The operating system can be a Unix based operating system such as the AIX® operating system from IBM® Corporation, a non-Unix based operating system such as the Windows® family of operating systems from Microsoft® Corporation, a network operating system such as JavaOS® from Oracle® Corporation, or any other suitable operating system. Processor unit 584 can be suitably programmed to read, load, and execute instructions of the operating system.

Communications unit 590, in this example, provides for communications with other computing or communications systems or devices. Communications unit 590 may provide communications through the use of physical and/or wireless communications links. Communications unit 590 may include a network interface card for interfacing with enterprise network 18, public network 15, an Ethernet adapter, a Token Ring adapter, a modem for connecting to a transmission system such as a telephone line, or any other type of communication interface. Communications unit 590 can be used for operationally connecting many types of peripheral computing devices to computing device 500, such as printers, bus adapters, and other computers. Communications unit 590 may be implemented as an expansion card or be built into a motherboard, for example.

The input/output unit 592 can support devices suited for input and output of data with other devices that may be connected to computing device 500, such as keyboard, a mouse or other pointer, a touchscreen interface, an interface for a printer or any other peripheral device, a removable magnetic or optical disc drive (including CD-ROM, DVD-ROM, or Blu-Ray), a universal serial bus (USB) receptacle, or any other type of input and/or output device. Input/output unit 592 may also include any type of interface for video output in any type of video output protocol and any type of monitor or other video display technology, in various examples. It will be understood that some of these examples may overlap with each other, or with example components of communications unit 590 or data storage 596. Input/output unit 592 may also include appropriate device drivers for any type of external device, or such device drivers may reside elsewhere on computing device 500 as appropriate.

Computing device 500 also includes a display adapter 594 in this illustrative example, which provides one or more connections for one or more display devices, such as display device 598, which may include any of a variety of types of display devices. It will be understood that some of these examples may overlap with example components of communications unit 590 or input/output unit 592. Input/output unit 592 may also include appropriate device drivers for any type of external device, or such device drivers may reside elsewhere on computing device 500 as appropriate. Display adapter 594 may include one or more video cards, one or more graphics processing units (GPUs), one or more video-capable connection ports, or any other type of data connector capable of communicating video data, in various examples. Display device 598 may be any kind of video display device, such as a monitor, a television, or a projector, in various examples.

Input/output unit 592 may include a drive, socket, or outlet for receiving computer program product 501, which comprises a computer readable medium 502 having computer program code 104 stored thereon. For example, computer program product 501 may be a CD-ROM, a DVD-ROM, a Blu-Ray disc, a magnetic disc, a USB stick, a flash drive, or an external hard disc drive, as illustrative examples, or any other suitable data storage technology.

Computer readable medium 502 may include any type of optical, magnetic, or other physical medium that physically encodes program code 504 as a binary series of different physical states in each unit of memory that, when read by computing device 500, induces a physical signal that is read by processor unit 584 that corresponds to the physical states of the basic data storage elements of computer readable medium 502, and that induces corresponding changes in the physical state of processor unit 584. That physical program code signal may be modeled or conceptualized as computer readable instructions at any of various levels of abstraction, such as a high-level programming language, assembly language, or machine language, but ultimately constitutes a series of physical electrical and/or magnetic interactions that physically induce a change in the physical state of processor unit 584, thereby physically causing or configuring processor unit 584 to generate physical outputs that correspond to the computer-executable instructions, in a way that causes computing device 500 to physically assume new capabilities that it did not have until its physical state was changed by loading the executable instructions comprised in program code 504.

In some illustrative examples, program code 504 may be downloaded over a network to data storage 596 from another device or computer system for use within computing device 500. Program code 504 comprising computer-executable instructions may be communicated or transferred to computing device 500 from computer readable medium 502 through a hard-line or wireless communications link to communications unit 590 and/or through a connection to input/output unit 592. Computer readable medium 502 comprising program code 504 may be located at a separate or remote location from computing device 500, and may be located anywhere, including at any remote geographical location anywhere in the world, and may relay program code 504 to computing device 500 over any type of one or more communication links, such as the Internet and/or other packet data networks. The program code 504 may be transmitted over a wireless Internet connection, or over a shorter-range direct wireless connection such as wireless LAN, Bluetooth, or an infrared connection, for example. Any other wireless or remote communication protocol may also be used in other implementations.

The communications link and/or the connection may include wired and/or wireless connections in various illustrative examples, and program code 504 may be transmitted from a source computer readable medium 502 over non-tangible media, such as communications links or wireless transmissions containing the program code 504. Program code 504 may be more or less temporarily or durably stored on any number of intermediate tangible, physical computer readable devices and media, such as any number of physical buffers, caches, main memory, or data storage components of servers, gateways, network nodes, mobility management entities, or other network assets, en route from its original source medium to computing device 500.

Aspects of the present disclosure may be implemented as a system, a method, and/or a computer program product at any possible technical detail level of integration. The computer program product may include a computer readable storage medium (or media) having computer readable program instructions thereon for causing a processor to carry out aspects of the present disclosure.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present disclosure are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various aspects of the present disclosure have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

The invention claimed is:

1. A computer-implemented method comprising:
inserting, by at least one processor, an encrypted value in a data field in a message that includes a plurality of data fields that store message data, a structure of the plurality of data fields and one or more attributes of at least one data field of the plurality of data fields being defined by a schema associated with the message, wherein the schema specifies a public key used to encrypt the encrypted value and further specifies a type of an unencrypted form of the encrypted value, wherein at least a portion of the schema is not included in the message;
inserting, by the at least one processor, one or more unencrypted values in one or more other data fields in the message; and
sending, by the at least one processor, the message to an external computing system that is configured to determine the schema associated with the message.

2. The method of claim 1, wherein the encrypted value is a first encrypted value in a first data field, and wherein the public key used to encrypt the encrypted value is a first public key, the method further comprising:
inserting, by the at least one processor, a second encrypted value in a second data field in the message, wherein the schema specifies a second public key used to encrypt the second encrypted value, wherein the schema specifies a type of the unencrypted form of the second encrypted value, and wherein the second public key is different from the first public key.

3. The method of claim 2,
wherein the schema specifies the first public key used to encrypt the first encrypted value as a first attribute for the first data field, and
wherein the schema specifies the second public key used to encrypt the second encrypted value as a second attribute for the second data field.

4. The method of claim 1, wherein the schema specifies the type of the unencrypted form of the encrypted value as a first attribute for the data field, and wherein the schema specifies a fixed size for the unencrypted form of the encrypted value as a second attribute for the data field.

5. The method of claim 1, wherein the schema is sent to the external computing system separate from the message.

6. The method of claim 1, wherein sending the message to the external computing system further comprises:
serializing, by the at least one processor, the message into an object; and
sending, by the at least one processor, the object to the external computing system.

7. A computing system comprising:
at least one processor; and
at least one memory device, wherein the at least one processor is configured to perform a method comprising:
inserting an encrypted value in a data field in a message that includes a plurality of data fields that store message data, a structure of the plurality of data fields and one or more attributes of at least one data field of the plurality of data fields being defined by a schema associated with the message, wherein the schema specifies a public key used to encrypt the encrypted value and further specifies a type of an unencrypted form of the encrypted value, wherein at least a portion of the schema is not included in the message,
inserting one or more unencrypted values in one or more other data fields in the message, and
sending the message to an external computing system that is configured to determine the schema associated with the message.

8. The computing system of claim 7, wherein the encrypted value is a first encrypted value in a first data field, wherein the public key used to encrypt the encrypted value is a first public key, and wherein the method performed by the at least one processor further comprises:
inserting a second encrypted value in a second data field in the message, wherein the schema specifies a second public key used to encrypt the second encrypted value, wherein the schema specifies a type of the unencrypted form of the second encrypted value, and wherein the second public key is different from the first public key.

9. The computing system of claim 8, wherein the schema specifies the first public key used to encrypt the first encrypted value as a first attribute for the first data field, and wherein the schema specifies the second public key used to encrypt the second encrypted value as a second attribute for the second data field.

10. The computing system of claim 7, wherein the schema specifies the type of the unencrypted form of the encrypted value as a first attribute for the data field, and wherein the schema specifies a fixed size for the unencrypted form of the encrypted value as a second attribute for the data field.

11. The computing system of claim 7, wherein the schema specifies an encryption algorithm used to encrypt the encrypted value of the data field as an attribute for the data field.

12. The computing system of claim 7, wherein the method performed by the at least one processor further comprises:
serializing the message into an object; and
sending the object to the external computing system.

13. A computer program product for sending a message, the computer program product comprising a computer readable storage medium having program code embodied therewith, the program code executable by at least one processor to:
insert an encrypted value in a data field in a message that includes a plurality of data fields that store message data, a structure of the plurality of data fields and one or more attributes of at least one data field of the plurality of data fields being defined by a schema associated with the message, wherein the schema specifies a public key used to encrypt the encrypted value and further specifies a type of an unencrypted form of the encrypted value, wherein at least a portion of the schema is not included in the message;
insert one or more unencrypted values in one or more other data fields in the message; and
send the message to an external computing system that is configured to determine the schema associated with the message.

14. The computer program product of claim 13, wherein the encrypted value is a first encrypted value in a first data field, wherein the public key used to encrypt the encrypted value is a first public key, and wherein the program code is further executable by the at least one processor to:
insert a second encrypted value in a second data field in the message, wherein the schema specifies a second public key used to encrypt the second encrypted value, wherein the schema specifies a type of the unencrypted form of the second encrypted value, and wherein the second public key is different from the first public key.

15. The computer program product of claim 14, wherein the schema specifies the first public key used to encrypt the first encrypted value as a first attribute for the first data field, and wherein the schema specifies the second public key used to encrypt the second encrypted value as a second attribute for the second data field.

16. The computer program product of claim 13, wherein the schema specifies the type of the unencrypted form of the encrypted value as a first attribute for the data field, and wherein the schema specifies a fixed size for the unencrypted form of the encrypted value as a second attribute for the data field.

17. The computer program product of claim 13, wherein the schema specifies an encryption algorithm used to encrypt the encrypted value of the data field as an attribute for the data field.

18. The computer program product of claim 13, wherein the program code is further executable by the at least one processor to:
serialize the message into an object; and
send the object to the external computing system.

19. A computer-implemented method comprising:
receiving, by at least one processor, a message that includes a plurality of data fields that store message data, the message including an encrypted value in a data field and one or more unencrypted values in one more other data fields, a structure of the plurality of data fields and one or more attributes of at least one data field of the plurality of data fields being defined by a schema associated with the message,
wherein the schema specifies a public key used to encrypt the encrypted value and further specifies a type of an unencrypted form of the encrypted value, and
wherein at least a portion of the schema is not included in the message;
determining, by the at least one processor, the schema that is associated with the message;
determining, by the at least one processor and based at least in part on the public key specified by the schema, a private key associated with the public key; and
decrypting, by the at least one processor using the private key, the encrypted value of the data field into the unencrypted form of the encrypted value.

20. The method of claim 19, wherein:
the encrypted value is a first encrypted value in a first data field;
the public key used to encrypt the encrypted value is a first public key;
the message further includes a second encrypted value in a second data field in the message;
the schema specifies a second public key used to encrypt the second encrypted value;
the schema specifies a type of the unencrypted form of the second encrypted value; and
the second public key is different from the first public key.

21. The method of claim 20, wherein:
the schema specifies the first public key used to encrypt the first encrypted value as a first attribute for the first data field; and
the schema specifies the second public key used to encrypt the second encrypted value as a second attribute for the second data field.

22. The method of claim 19, further comprising:
validating, by the at least one processor, the message based at least in part on the schema, including validating the type of the unencrypted form of the encrypted value based at least in part on the type of the unencrypted form of the encrypted value specified by the schema.

23. A computing system comprising:
at least one processor; and
at least one memory device, wherein the at least one processor is configured to perform a method comprising:
receiving a message that includes a plurality of data fields that store message data, the message including an encrypted value in a data field and one or more unencrypted values in one more other data fields, a structure of the plurality of data fields and one or more attributes of at least one data field of the plurality of data fields being defined by a schema associated with the message,
wherein the schema specifies a public key used to encrypt the encrypted value and further specifies a type of an unencrypted form of the encrypted value, and
wherein at least a portion of the schema is not included in the message;
determining, by the at least one processor, the schema that is associated with the message;
determining, based at least in part on the public key specified by the schema, a private key associated with the public key; and
decrypting, using the private key, the encrypted value of the data field into the unencrypted form of the encrypted value.

24. The computing system of claim 23, wherein:
the encrypted value is a first encrypted value in a first data field;
the public key used to encrypt the encrypted value is a first public key;
the message further includes a second encrypted value in a second data field in the message;
the schema specifies a second public key used to encrypt the second encrypted value;
the schema specifies a type of the unencrypted form of the second encrypted value; and
the second public key is different from the first public key.

25. The computing system of claim 24, wherein:
the first public key and the private key are stored in a key store that includes a plurality of key pairs, wherein the first public key and the private key are associated with each other in the key store;

the method further comprises sending, in response to receiving the message, the first public key to the key store and receiving, from the key store, the private key associated with the first public key;

the schema specifies the first public key used to encrypt the first encrypted value as a first attribute for the first data field; and the schema specifies the second public key used to encrypt the second encrypted value as a second attribute for the second data field.

* * * * *